(12) United States Patent
Mizuno et al.

(10) Patent No.: US 11,579,092 B2
(45) Date of Patent: Feb. 14, 2023

(54) SAMPLE INTRODUCTION DEVICE, INDUCTIVELY COUPLED PLASMA ANALYZING DEVICE AND ANALYZING METHOD

(71) Applicants: SUMCO CORPORATION, Tokyo (JP); NATIONAL INSTITUTE OF ADVANCED INDUSTRIAL SCIENCE AND TECHNOLOGY, Tokyo (JP)

(72) Inventors: Taisuke Mizuno, Saga (JP); Kazumi Inagaki, Ibaraki (JP); Shinichiro Fujii, Ibaraki (JP); Shinichi Miyashita, Ibaraki (JP)

(73) Assignees: SUMCO CORPORATION, Tokyo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 17/235,182

(22) Filed: Apr. 20, 2021

(65) Prior Publication Data
US 2021/0333212 A1    Oct. 28, 2021

(30) Foreign Application Priority Data

Apr. 23, 2020  (JP) .............................. JP2020-076455
Jul. 28, 2020  (JP) .............................. JP2020-127491

(51) Int. Cl.
*G01N 21/73*   (2006.01)
*G01N 27/68*   (2006.01)

(52) U.S. Cl.
CPC ............. *G01N 21/73* (2013.01); *G01N 27/68* (2013.01)

(58) Field of Classification Search
CPC ...... G01N 21/73; G01N 27/68; G01N 21/714; H01J 49/045; H01J 49/0468; H01J 49/105
(Continued)

(56) References Cited

U.S. PATENT DOCUMENTS 5,367,163 A * 11/1994 Otsuka ................. H01J 49/105
                                                         250/281
5,596,405 A *  1/1997 Seltzer .................... G01N 21/73
                                                         356/243.2
(Continued)

FOREIGN PATENT DOCUMENTS

CA        2561007 C  *  5/2013  ............. G01N 15/10
DE    112018002448 T5     2/2020
(Continued)

OTHER PUBLICATIONS

German Office Action dated Sep. 28, 2022 issued in German patent application No. 10 2021 002 086.3 along with corresponding English translation.

*Primary Examiner* — Sunghee Y Gray
(74) *Attorney, Agent, or Firm* — Greenblum & Bernstein, P.L.C.

(57) ABSTRACT

The sample introduction device includes a nebulizer that atomizes a sample liquid; a spray chamber that has one end into which a spray port part of the nebulizer is inserted and the other end from which at least a part of liquid droplets of the sample liquid sprayed from the spray port part is discharged to an outside; and a heating electromagnetic wave radiation unit that is arranged outside the spray chamber, wherein the heating electromagnetic wave radiation unit performs radiation of heating electromagnetic waves from the outside of the spray chamber toward at least a part of the
(Continued)

spray chamber other than a part into which the spray port part of the nebulizer is inserted.

12 Claims, 12 Drawing Sheets

(58) Field of Classification Search
USPC .......................................................... 356/316
See application file for complete search history.

(56) References Cited

U.S. PATENT DOCUMENTS

| | | | |
|---|---|---|---|
| 2018/0024068 A1* | 1/2018 | Kawabata | H01J 49/105 |
| | | | 250/281 |
| 2020/0185210 A1* | 6/2020 | Matsushita | H01J 49/4215 |
| 2021/0202228 A1* | 7/2021 | Hiramatsu | H01J 49/0422 |

FOREIGN PATENT DOCUMENTS

| | | | | |
|---|---|---|---|---|
| JP | H05-190136 A | 7/1993 | | |
| JP | H05-256837 A | 10/1993 | | |
| JP | 2008-157895 | 7/2008 | | |
| JP | 4333542 B2 * | 9/2009 | | |
| WO | WO-2015046474 A1 * | 4/2015 | ........... | A61F 7/0053 |

* cited by examiner

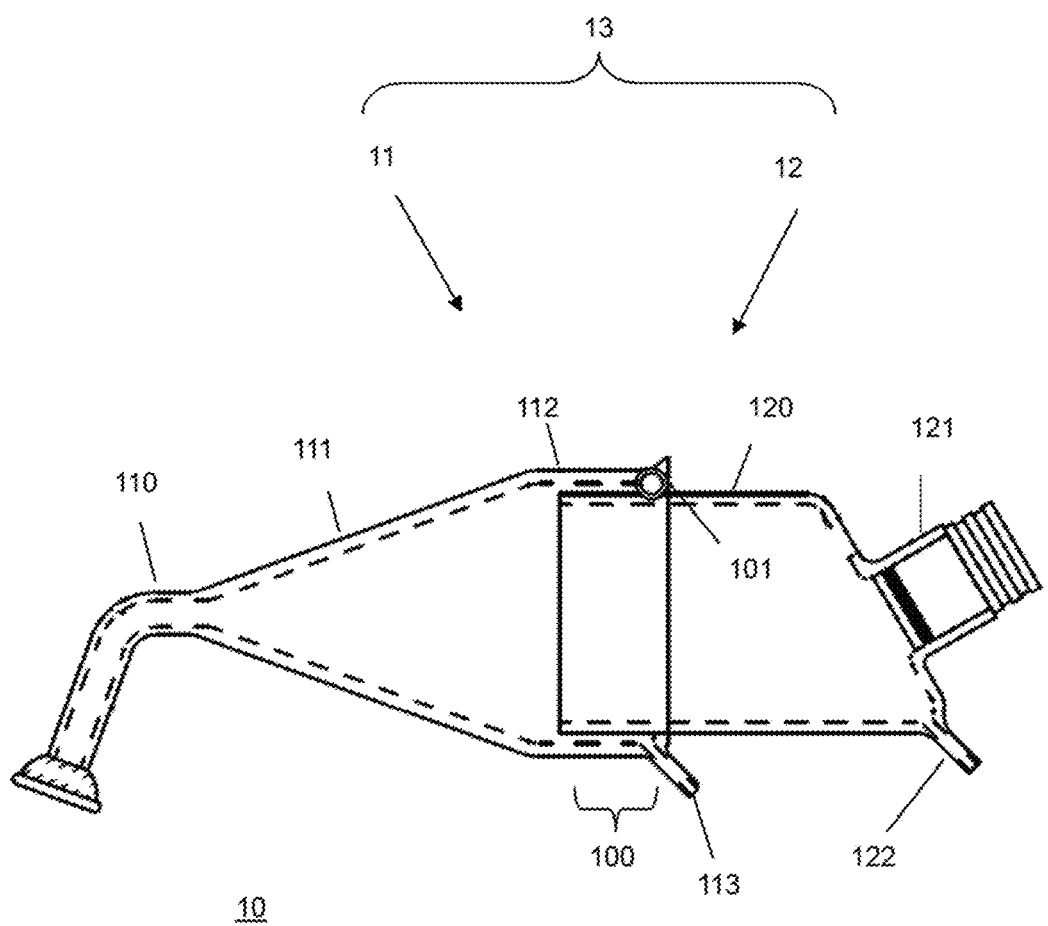

SAMPLE INTRODUCTION DEVICE, INDUCTIVELY COUPLED PLASMA ANALYZING DEVICE AND ANALYZING METHOD

CROSS-REFERENCE TO RELATED APPLICATIONS

This application claims priority under 35 U.S.C 119 to Japanese Patent Application No. 2020-076455 filed on Apr. 23, 2020 and Japanese Patent Application No. 2020-127491 filed on Jul. 28, 2020. Each of the above applications is hereby expressly incorporated by reference, in its entirety, into the present application.

FIELD OF THE INVENTION

The present invention relates to a sample introduction device, an inductively coupled plasma analyzing device, and an analyzing method.

DISCUSSION OF THE BACKGROUND

In order to atomize a sample liquid and introduce the atomized sample liquid into an analyzing unit as liquid droplets, a sample introduction device including a nebulizer (atomizer) and a spray chamber is provided in various analyzing devices (see, for example, Japanese Patent Application Laid-open No. 2008-157895, which is expressly incorporated herein by reference in its entirety).

SUMMARY OF THE INVENTION

In order to obtain a reliable analysis result using an analyzing device, it is desirable that a measurement result should not greatly fluctuate even if the analyzing device is continuously used. However, according to a study by the present inventors, it has become apparent that a device described in Japanese Patent Application Laid-open No. 2008-157895 is not necessarily sufficient in this regard.

An aspect of the present invention provides for a sample introduction device that allows an analyzing device to obtain a reliable analysis result.

An aspect of the present invention relates to a sample introduction device including:

a nebulizer that atomizes a sample liquid;

a spray chamber that has one end into which a spray port part of the nebulizer is inserted and the other end from which at least a part of liquid droplets of the sample liquid sprayed from the spray port part is discharged to an outside; and a heating electromagnetic wave radiation unit that is arranged outside the spray chamber, wherein the heating electromagnetic wave radiation unit performs radiation of heating electromagnetic waves from the outside of the spray chamber toward at least a part of the spray chamber other than a part into which the spray port part of the nebulizer is inserted.

Japanese Patent Application Laid-open No. 2008-157895 described above discloses a sample introduction device including heating light radiation means. When sample liquid droplets, which were atomized by a nebulizer and introduced into a chamber, are heated by heating light, the evaporation of at least a part of a solvent included in the sample liquid droplets is allowed, resulting in reduction of an amount of the solvent introduced into the analyzing unit of an analyzing device. The present inventors consider that this can reduce a load, due to evaporation energy of the solvent, on the analyzing unit of the analyzing device and thus yield increase in measurement signal intensity obtained by the analyzing unit. However, in the device described in Japanese Patent Application Laid-open No. 2008-157895, the radiation of heating light by the radiation means is performed so as to cover the spray port of the nebulizer (see claim 1, FIG. 1, or the like of Japanese Patent Application Laid-open No. 2008-157895). In contrast, in the sample introduction device according to an aspect of the present invention, the heating electromagnetic wave radiation unit performs the radiation of heating electromagnetic waves toward at least a part other than a part into which the spray port part of the nebulizer of the spray chamber is inserted. That is, the spray port part of the nebulizer is free from the direct radiation of the heating electromagnetic waves. The present inventors consider that this configuration contributes to the fact that a measurement result does not greatly fluctuate even if an analyzing device including the sample introduction device is continuously used. The details of the fact will be described as follows.

When the radiation of heating light is performed so as to cover the spray port of the nebulizer like the device described in Japanese Patent Application Laid-open No. 2008-157895, it seems that a component included in a sample liquid is dried at the spray port of the nebulizer and deposited inside or at the tip of the spray port as the radiation is continued. If adhering matter such as a deposit and a laminated carbide is attached inside or at the tip of the spray port during analysis by an analyzing device, it seems that a fluctuation in the amount of sample liquid droplets sprayed from the nebulizer occurs and thus causes reason for a great fluctuation in a measurement result.

In contrast, in the sample introduction device according to an aspect of the present invention, the spray port part of the nebulizer is free from the direct radiation of heating electromagnetic waves. Thus, it seems possible to reduce a fluctuation in the amount of sample liquid droplets sprayed from the nebulizer during analysis by an analyzing device and perform reliable analysis without a great fluctuation in a measurement result.

In an embodiment, the above heating electromagnetic waves can include near-infrared rays.

In an embodiment, the above spray chamber can be made of glass, quartz, or a fluororesin.

In an embodiment, the above heating electromagnetic wave radiation unit can perform the radiation of the heating electromagnetic waves toward at least a part of the spray chamber that is close to the end of the spray chamber to which at least a part of the liquid droplets is discharged.

In an embodiment, the above heating electromagnetic wave radiation unit can have a ring shape, and the above spray chamber may be inserted into a hollow part of the ring shape.

In an embodiment, an amount of introduction of the sample liquid into the above nebulizer can be equal to or more than 1 µL/min and equal to or less than 500 µL/min.

An aspect of the present invention relates to an inductively coupled plasma analyzing device including the above sample introduction device and an analyzing unit.

In an embodiment, the above inductively coupled plasma analyzing device can include a plasma torch and an injector that introduces an analysis target sample into the plasma torch, and an inner diameter of the injector may be equal to or more than 0.50 mm and equal to or less than 1.50 mm.

In an embodiment, the above inductively coupled plasma analyzing device can further include a gas supply source that supplies argon gas to the plasma torch and one or more gas supply sources that supply one or more types of gas other than the argon gas.

In an embodiment, the one or more types of gas described above can be selected from the group consisting of nitrogen gas, oxygen gas, and hydrogen gas, and the gas may be supplied to the plasma torch by an amount smaller than an amount of the argon gas per unit time.

In an embodiment, the above inductively coupled plasma analyzing device can be an inductively coupled plasma-mass spectrometer or an inductively coupled plasma-atomic emission spectrometer.

An aspect of the present invention relates to an analyzing method including performing qualitative analysis, quantitative analysis, or the qualitative analysis and the quantitative analysis of an analysis target sample with the above inductively coupled plasma analyzing device.

In an embodiment, the above analyzing method can perform the qualitative analysis, the quantitative analysis, or the quantitative analysis and the quantitative analysis of a metal component in an analysis target sample.

According to an aspect of the present invention, it is possible to provide a sample introduction device that allows an analyzing device to obtain a reliable analysis result. In addition, according to an aspect of the present invention, it is possible to provide an inductively coupled plasma analyzing device including the above sample introduction device and an analyzing method using the above inductively coupled plasma analyzing device.

BRIEF DESCRIPTION OF THE DRAWINGS

FIG. 3B is a schematic view (side view) showing an example of the spray chamber;

DESCRIPTION OF THE EMBODIMENTS

[Sample Introduction Device]

Figure 1:
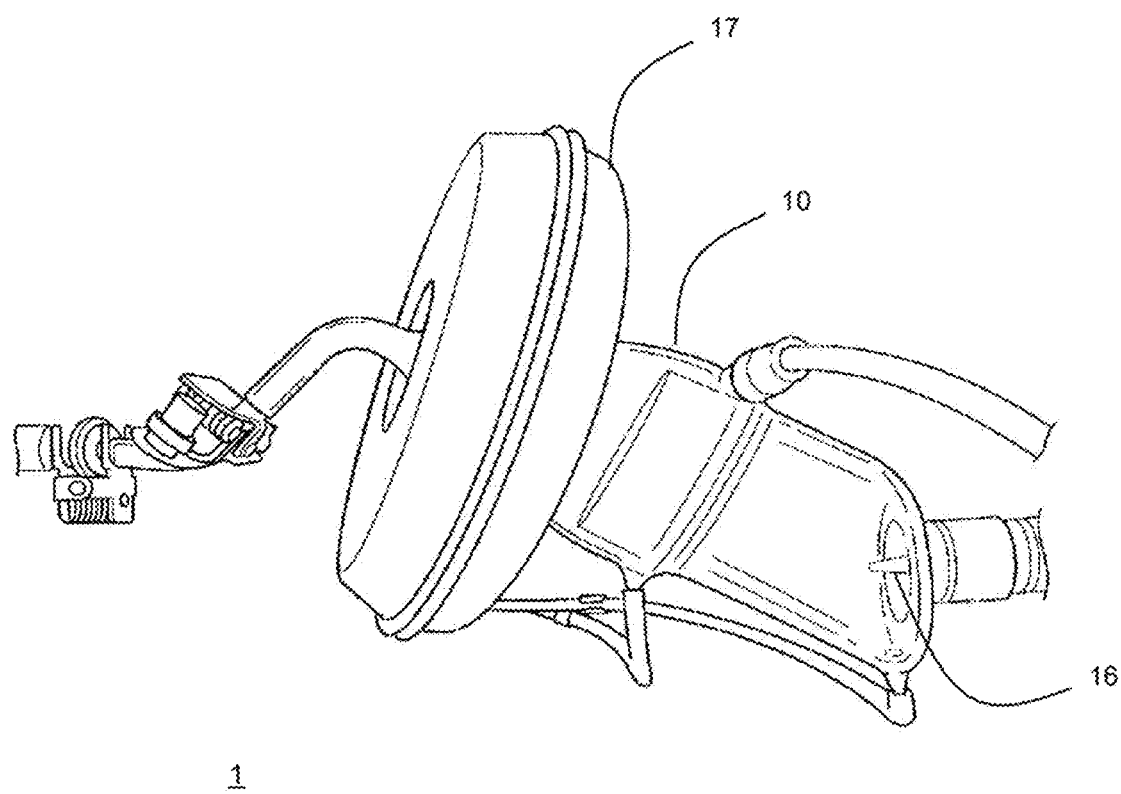
FIG. 1 is a schematic view (side view) showing an example of a sample introduction device according to an aspect of the present invention.

Hereinafter, the above sample introduction device will be described in further detail. The description of the sample introduction device will be given with reference to the drawings. However, embodiments shown in the drawings are given only for illustration, and the present invention is not limited to the embodiments.

FIG. 1 is a schematic view (side view) showing an example of a sample introduction device according to an aspect of the present invention. A sample introduction device 1 shown in FIG. 1 includes a spray chamber 10, a nebulizer 16, and a heating electromagnetic wave radiation unit 17.

<Heating Electromagnetic Wave Radiation Unit>

In the sample introduction device 1 shown in FIG. 1, the heating electromagnetic wave radiation unit 17 is arranged at a position at which a spray port part at the tip of the nebulizer 16 is not radiated with heating electromagnetic waves. It seems that the arrangement of the heating electromagnetic wave radiation unit like this can contribute to the fact that a measurement result does not greatly fluctuate even if an analyzing device including the sample introduction device is continuously used. In addition, at least a part of a solvent included in sample liquid droplets introduced from the nebulizer can be evaporated with the radiation of heating electromagnetic waves from the heating electromagnetic wave radiation unit. It seems that this can reduce a load, due to evaporation energy of the solvent, on the analyzing unit of the analyzing device and thus yield increase in measurement signal intensity obtained by the analyzing unit. Further, the arrangement of means for performing the radiation of heating electromagnetic waves outside the spray chamber can prevent the occurrence of contamination inside the spray chamber due to the means.

Heating electromagnetic waves radiated from the heating electromagnetic wave radiation unit can be various electromagnetic waves with which it is possible to heat the liquid droplets of a sample liquid flowing through the inside of the spray chamber. Examples of the electromagnetic waves can include infrared rays, microwaves and the like. Here, the "infrared rays" represent electromagnetic waves having a wavelength of 780 nm to 1000 μm and include near-infrared rays (having a wavelength of 780 nm to 2 μm), mid-infrared rays (having a wavelength of more than 2 μm to 4 μm), and far-infrared rays (having a wavelength of more than 4 μm to 1000 μm). The "microwaves" represent electromagnetic waves having a wavelength of 1 cm to 10 cm. In an embodiment, heating electromagnetic waves radiated from the heating electromagnetic wave radiation unit are preferably electromagnetic waves with which it is possible to heat the liquid droplets of a sample liquid flowing through the spray chamber without increasing the temperature of the spray chamber (or while suppressing the temperature increasing degree of the spray chamber). This is because contamination on the inside of the spray chamber caused when a contaminant bleeds out from the spray chamber with an increase in the temperature of the spray chamber can be prevented. In this regard, the heating electromagnetic waves preferably include near-infrared rays and are more preferably near-infrared rays.

In an embodiment, the heating electromagnetic wave radiation unit can have a ring shape. The spray chamber can be inserted into the hollow part of the ring shape. The heating electromagnetic wave radiation unit having the ring shape can perform the radiation of heating electromagnetic waves toward the inside of a ring. An example of the heating electromagnetic wave radiation unit according to such an embodiment is the heating electromagnetic wave radiation unit 17 shown in FIG. 1. The heating electromagnetic wave radiation unit can have, for example, a configuration in which a plurality of electromagnetic wave radiation means (for example, infrared lamps, microwave generation sources, or the like) are arranged in a circumferential direction inside a ring-shaped cover part, a configuration in which ring-shaped electromagnetic wave radiation means is arranged inside the ring-shaped cover part. Further, the inner wall of the ring-shaped cover part can be made of a material having reflectivity to heating electromagnetic waves. However, the heating electromagnetic wave radiation unit of the above sample introduction device is only required to be one that is capable of performing the radiation of heating electromagnetic waves toward at least a part of the spray chamber other than a part into which the spray port part of the nebulizer is inserted from the outside of the spray chamber. The heating electromagnetic wave radiation unit is not limited to a ring-shaped one. It can have various shapes and various configurations.

The installation position of the heating electromagnetic wave radiation unit of the above sample introduction device will be further described later.

<Nebulizer>

As the nebulizer of the above sample introduction device, a nebulizer (also called an atomizer) having a known configuration with which it is possible to perform the atomization of liquid droplets can be used. The nebulizer is capable of atomizing a sample liquid introduced into the nebulizer and spraying a gas flow including the liquid droplets of the atomized sample liquid to be introduced into the spray chamber. The introduction amount of a sample liquid into the nebulizer is only required to be determined according to the type or the like of an analyzing device into which a sample is introduced by the sample introduction device. The introduction amount can be, for example, equal to or more than 1 μL/min and equal to or less than 500 μL/min. The nebulizer is capable of generating a gas flow including sample liquid droplets (the atomization of a sample) by, for example, mixing a sample liquid with carrier gas and spraying the mixture. As the carrier gas, one type or two or more types of inert gas is generally used. Specific examples of the carrier gas include argon gas.

A gas flow including sample liquid droplets atomized by the nebulizer is introduced into the spray chamber and flows through the spray chamber.

<Spray Chamber>

The spray chamber of the above sample introduction device is only required to be one having a configuration that makes it possible to introduce liquid droplets by means of a gas flow from one end and discharge at least a part of the introduced liquid droplets to an outside from the other end. According to such configuration, it is possible to introduce the liquid droplets of a sample liquid together with a gas flow from one end of the spray chamber and discharge at least a part of the liquid droplets of the introduced sample liquid to the outside from the other end. Generally, a spray chamber is capable of selecting the particle size of liquid droplets according to a gravity difference by making use of a difference in weight based on a difference in the particle sizes of the liquid droplets and playing a role in selectively introducing fine liquid droplets into an analyzing device.

The above spray chamber can be a single tubular member or a member in which two or more members are combined together. From the viewpoint of the permeability of heating electromagnetic waves, the spray chamber is preferably made of glass, quartz, or a fluororesin.

Hereinafter, an example of the spray chamber of the above sample introduction device will be described with reference to the drawings. However, the spray chamber of the above sample introduction device is not limited to the illustrated example.

Figure 2:
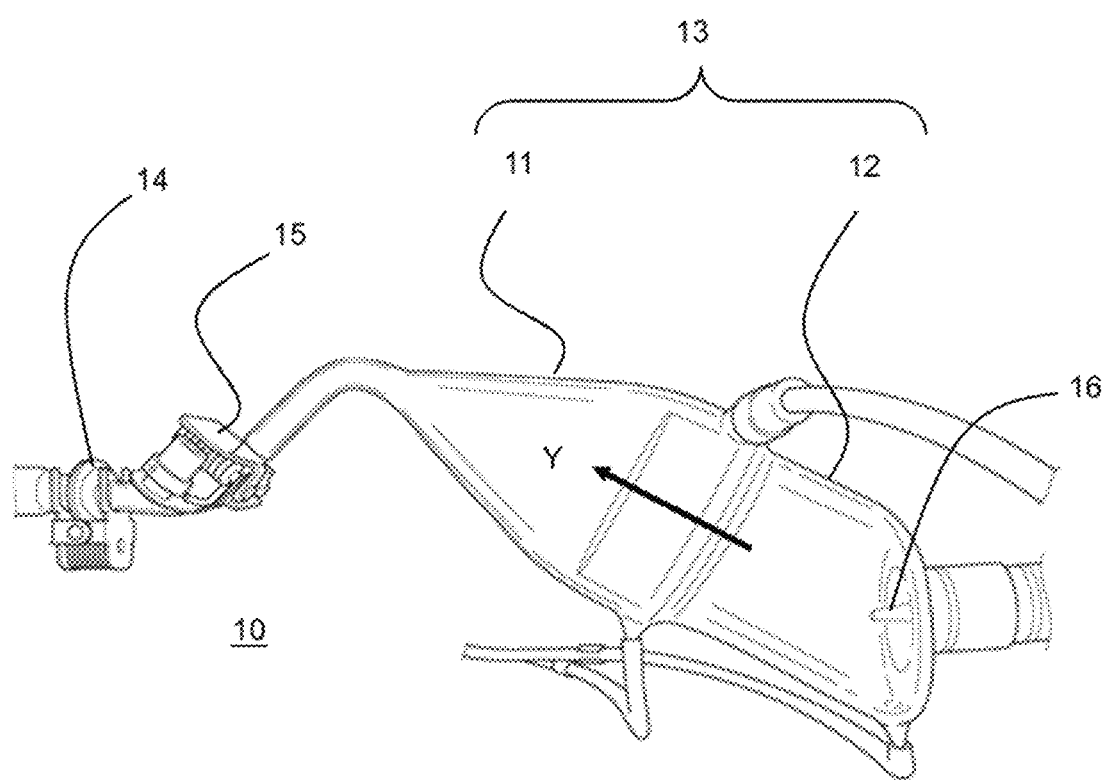
FIG. 2 is a schematic view (side view) showing an example of a spray chamber.
Figure 2:
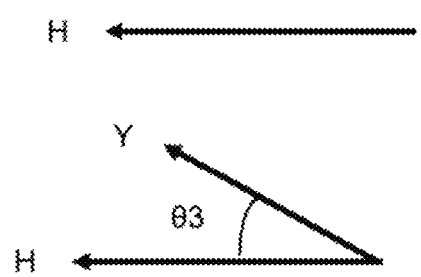
Figure 3A:
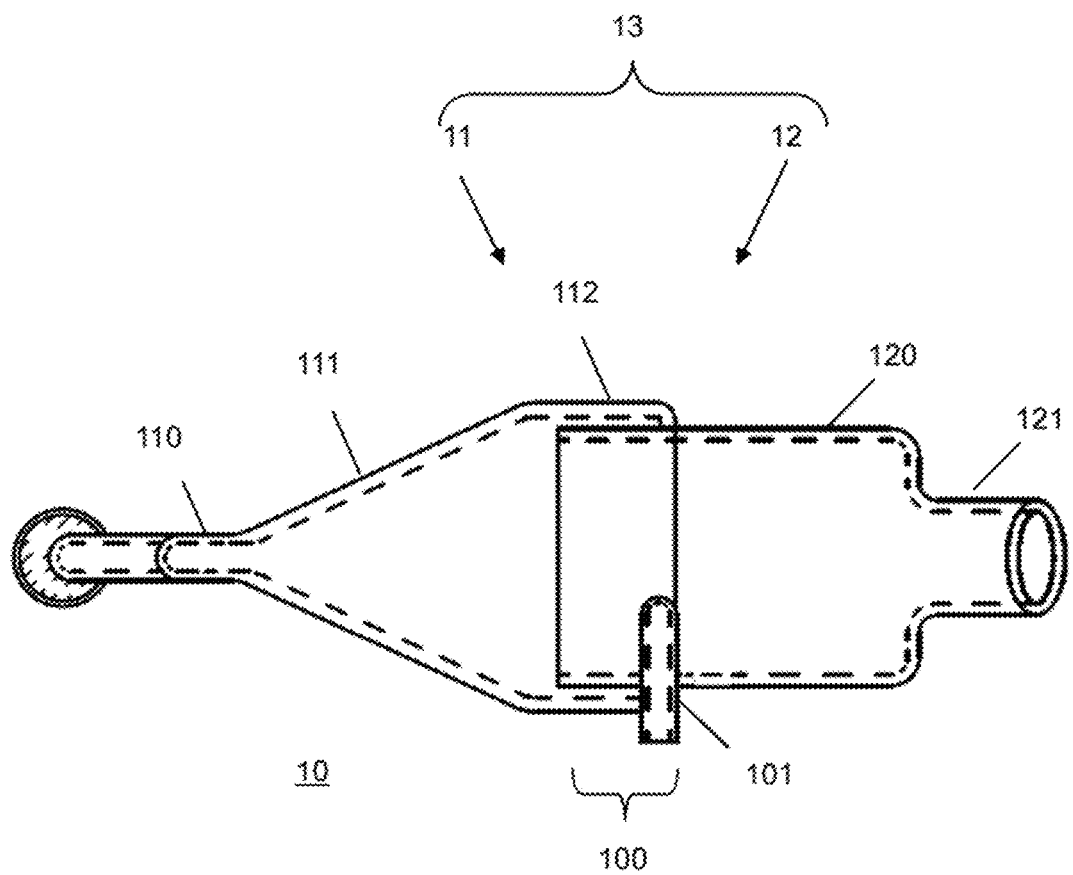
FIG. 3A is a schematic view (top view) showing an example of the spray chamber.

FIG. 2 is a schematic view (side view) showing an example of the spray chamber. The spray chamber 10 shown in FIG. 2 is composed of a flow path tube part 13 including a first tube part 11 and a second tube part 12. In the spray chamber 10 according to an embodiment shown in FIG. 2, the first tube part 11 is connected to an analyzing unit that will be described in detail later. Specifically, the first tube part 11 is connected to an inlet part 14 of the analyzing unit, that is a part positioned on the side closest to the spray chamber, via a joint member 15. Further, in the spray chamber 10 shown in FIG. 2, the second tube part 12 is connected to the nebulizer 16. FIGS. 3A and 3B are schematic views showing only the spray chamber. FIG. 3A is a top view, and FIG. 3B is a side view. In FIGS. 3A and 3B, dotted lines show thickness and do not show a double tube.

The spray chamber 10 shown in FIGS. 3A and 3B is composed of the flow path tube part 13 having a discharging port part 110 at one end and a sample introduction port part 121 at the other end. The flow path tube part 13 is constituted by the first tube part 11 and the second tube part 12. The first tube part 11 is composed of the discharging port part 110, a cone part 111, and a cylinder part 112. On the other hand, the second tube part 12 is composed of a cylinder part 120 and the sample introduction port part 121. When the cylinder part 112 of the first tube part 11 and the cylinder part 120 of the second tube part 12 are at least partially overlapped and joined to each other, a double tube part 100 is constituted. Accordingly, the inside wall surface of the space of the double tube of the double tube part 100 corresponds to the outside lateral surface of the cylinder part 120 of the second tube part 12, and the outside wall surface of the space of the double tube of the double tube part 100 corresponds to the inside wall surface of the cylinder part 112 of the first tube part 11.

Next, the first tube part and the second tube part will be described in further detail.

In FIGS. 3A and 3B, the first tube part 11 has the discharging port part 110 at one end, and the discharging port part 110 is in communication with the cone part 111. The cone part 111 has a cone shape of which the inner diameter reduces toward the side of the discharging port part. The cone part 111 is in communication with the cylinder part 112 including the other end of the first tube part.

On the other hand, in the second tube part 12, the cylinder part 120 including one end of the second tube part and the sample introduction port part 121 including the other end thereof are in communication with each other.

By the first tube part 11 and the second tube part 12 thus structured, the flow path tube part 13 is constituted. In addition, the double tube part 100 is constituted when the cylinder parts of both tube parts are overlapped with each other at the connection between the first tube part 11 and the second tube part 12. The double tube part represents the part between an opening at the end of the cylinder part of the first tube part and an opening at the end of the cylinder part of the second tube part. Accordingly, both ends of the double tube part are openings, and an imaginary plane surrounded by the openings will be called a bottom surface below. In an embodiment shown in FIGS. 3A and 3B, the first tube part 11 and the second tube part 12 are separate members. When the cylinder part 120 of the second tube part 12 is inserted into the opening at the end of the cylinder part 112 of the first tube part 11, both tube parts are connected to each other to constitute the flow path tube part 13. For example, if the cylinder part 112 of the first tube part 11 narrows in a tapered shape at the end and the inner diameter of the opening at the end has substantially the same shape as that of the outer diameter of the opening at the end of the cylinder part 120 of the second tube part 12, it is possible to prevent the leakage of additional gas introduced into the double tube part 100 formed by connecting both tube parts to each other to the outside from the connection between both tube parts. Alternatively, the sealing performance of the connection can be secured by a seal member or the like. As for the sealing performance of the connection, it is not necessary to completely prevent the leakage of the additional gas. The leakage of the additional gas to such a degree that the flow of the additional gas introduced into the double tube part as a gas flow is not disturbed is allowed. Alternatively, the first tube part and the second tube part can be integrally molded to constitute the flow path tube part.

The double tube part 100 has an opening at its outside lateral surface, that is, at the outside lateral surface of the cylinder part 112 of the first tube part 11. The opening is an opening (additional gas introduction opening) to introduce the additional gas into the double tube part (that is, space surrounded by the inside wall surface and the outside wall surface of the double tube part). An additional gas introduction tube part 101 serves as an introduction path to introduce the additional gas into the double tube part via the opening. Since the additional gas is introduced from the additional gas introduction part into the double tube part via the opening, the introduced additional gas can turn inside the double tube part and generate a spiral gas flow (additional gas flow) toward the cone part 111 of the first tube part 11. The existence of the cone part of which the inner diameter reduces toward the side of the discharging port part of the spray chamber can also contribute to the fact that the additional gas flow becomes a spiral gas flow. The additional gas flow thus generated can become a gas flow that is spirally directed to the discharging port part along the wall surface of the cone part. By such an additional gas flow, it is possible to prevent the attachment of sample liquid droplets onto the wall surface of the cone part. In addition, the additional gas flow can be guided to the discharging port part while taking in the sample liquid droplets.

In an embodiment shown in FIGS. 3A and 3B, the cylinder part 112 of the first tube part 11 has a waste liquid opening and a waste liquid tube part 113 to discharge a waste liquid via the waste liquid opening, besides the additional gas introduction opening. The waste liquid tube part 113 can also serve as a waste liquid path to discharge a waste liquid from the inside to the outside of the double tube part 100. Further, in the embodiment shown in FIGS. 3A and 3B, the second tube part 12 also has a waste liquid tube part 122. The waste liquid tube part 122 can serve as a waste liquid path to discharge a waste liquid from the inside to the outside of the second tube part 12.

Next, the respective parts of the above spray chamber will be described in further detail.

Figure 4A:
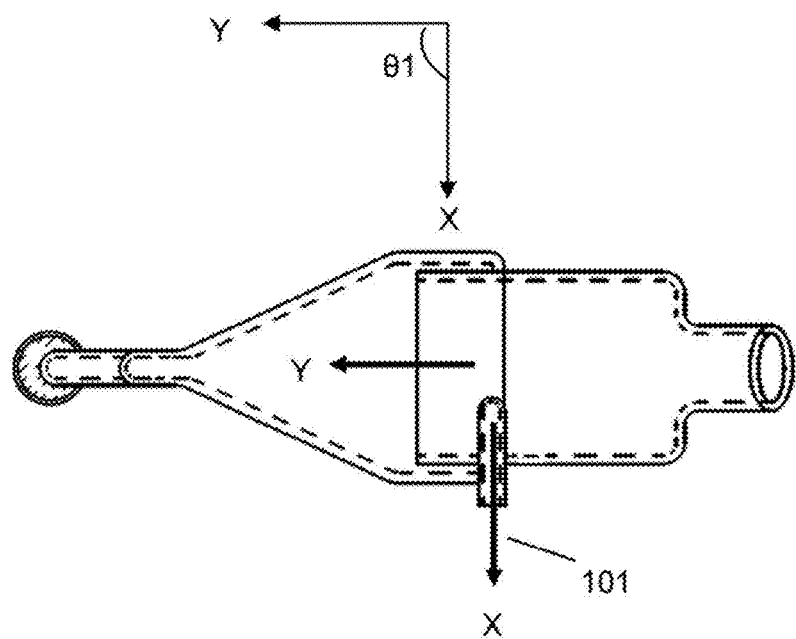
FIG. 4A is an explanatory view for explaining the arrangement of an additional gas introduction tube part in the spray chamber shown in FIGS. 3A and 3B.
Figure 4B:
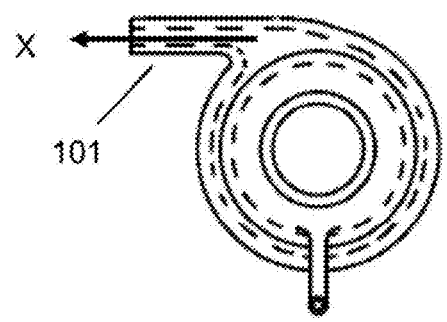
FIG. 4B is an explanatory view for explaining the arrangement of the additional gas introduction tube part in the spray chamber shown in FIGS. 3A and 3B.
Figure 4C:
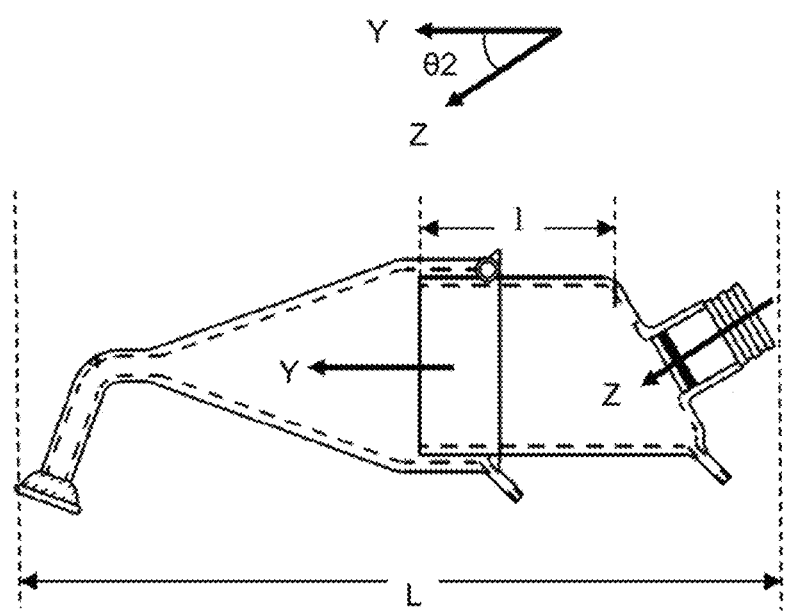
FIG. 4C is an explanatory view for explaining the arrangement of the additional gas introduction tube part in the spray chamber shown in FIGS. 3A and 3B.

FIGS. 4A to 4C are views for explaining the arrangement of the additional gas introduction tube part in the spray chamber shown in FIGS. 3A and 3B. FIG. 4A is a view obtained by adding arrows for explanation to the top view shown in FIG. 3A. FIG. 4B is a cross-sectional view of a part including the additional gas introduction tube part of the double tube part. FIG. 4C is a view obtained by adding arrows for explanation to the side view shown in FIG. 3B. The arrows in the FIGS. 4A to 4C show the following directions. An X direction represents the central axis direction of the additional gas introduction tube part. A Y direction represents the central axis direction of the cylinder part of the first tube part as well as corresponds to the central axis direction of the cone part of the first tube part and the central axis direction of the cylinder part of the second tube part. Further, the Y direction also corresponds to the central axis direction of the flow path tube part. A Z direction represents the central axis direction of the sample introduction port part.

Figure 5A:
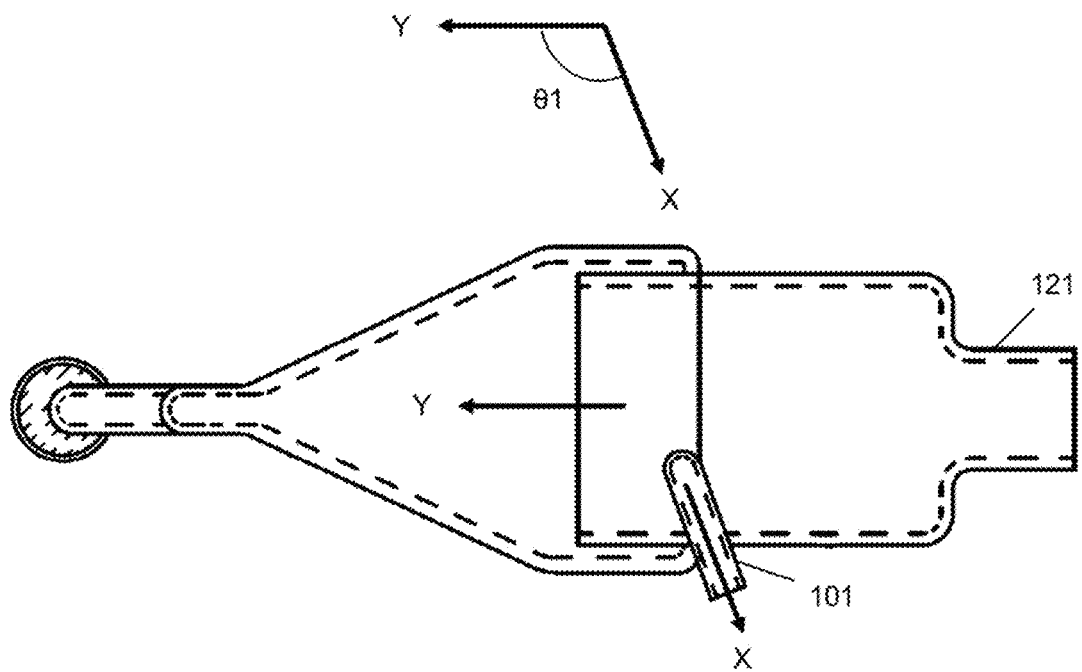
FIG. 5A is a schematic view (top view) showing another example of the spray chamber.
Figure 5B:
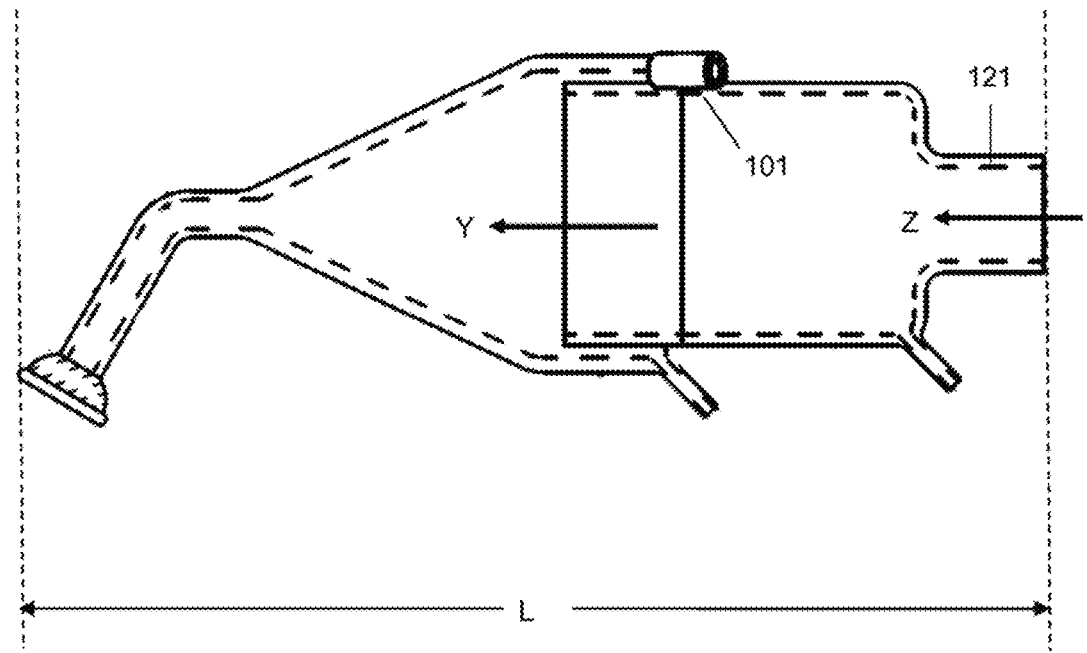
FIG. 5B is a schematic view (top view) showing the other example of the spray chamber.

FIGS. 5A and 5B are a top view and a side view of a spray chamber, respectively, according to another embodiment. In an embodiment shown in FIGS. 5A and 5B, a spray chamber is the same as the spray chamber shown in FIGS. 2, 3A, 3B, and 4A to 4C except that the arrangements of an additional gas introduction tube part 101 and a sample introduction port part 121 are different. The description of the same points will be omitted.

An angle $\theta 1$ formed by the X direction and the Y direction is 90° in an embodiment shown in FIGS. 4A to 4C and is 110° in an embodiment shown in FIGS. 5A and 5B. The angle $\theta 1$ is defined in the range of 0° to 180°. The angle $\theta 1$ is preferably in the range of 90° to 130° from the viewpoint of smoothly turning the gas flow of the additional gas introduced from the additional gas introduction tube part inside the double tube part. Further, the additional gas introduction opening can be provided at an arbitrary position on the outside lateral surface of the double tube part. For example, the additional gas introduction opening can be provided at a position close to the second tube part or a position close to the first tube part, relative to the center of the outside lateral surface of the double tube part, or can be provided at a position at which the center of the additional gas introduction opening corresponds to the center of the outside lateral surface of the double tube part. From the viewpoint of smoothly turning the gas flow of the additional gas introduced from the additional gas introduction tube part inside the double tube part, the additional gas introduction opening is preferably provided at a position close to the second tube part on the outside lateral surface of the double tube part. It is more preferable that the additional gas introduction opening is provided at a position closer to the second tube part.

From the viewpoint of smoothly turning the gas flow of the additional gas introduced from the additional gas introduction tube part inside the double tube part, the length of the double tube part, that is, the shortest distance between a bottom surface on the side of the first tube part and a bottom surface on the side of the second tube part is preferably in the range of 10.0 mm to 30.0 mm. Further, the diameter of the additional gas introduction opening is preferably in the range of 0.1 mm to 3.0 mm. The same applies to the diameter of the waste liquid opening.

In the first tube part, the cone part is a part that is positioned between the cylinder part and the discharging port part, and has an inner diameter that reduces toward the side of the discharging port part. In the first tube part, a position at which a change in the inner diameter starts from the side of the cylinder part to the side of the discharging port part is one end of the cone part, and a position at which the change in the inner diameter ends is the other end of the cone part. The shortest distance from one end to the other end of the cone part will be called the length of the cone part. The ratio of the length of the cone part to the maximum inner diameter of the cone part (the length/the maximum inner diameter) is preferably equal to or more than 0.3, from the viewpoint of reducing the wall surface attachment loss of sample liquid droplets in the cone part. When the ratio is equal to or more than 0.3 (more specifically equal to or more than 0.5 and still more preferably equal to or more than 0.8), it is possible to more smoothly spirally turn the gas flow of the additional gas in the cone part. Further, the length of the cone part becomes longer relative to the maximum inner diameter of the cone part as the ratio becomes larger. The ratio can be, for example, equal to or less than 4.0 or equal to or less than 3.5. However, the whole length of the spray chamber becomes longer and larger in size as the ratio becomes larger with an increase in the length of the cone part. On the other hand, a study by the present inventors shows that a change in analytical sensitivity is not found any more even if the length of the cone part is increased when the ratio becomes more than 3.0. Accordingly, the ratio is preferably equal to or less than 3.0, from the viewpoint of both an improvement in the analytical sensitivity and the miniaturization of the spray chamber.

The maximum inner diameter of the cone part of the first tube part is preferably in the range of, for example, 25.0 mm to 65.0 mm. The maximum inner diameter of the cone part is equal to the inner diameter of the cylinder part that is in communication with the cone part. As described above, the cylinder part can have a shape that reduces in a tapered shape at its end. In this case, the inner diameter of the cylinder part represents the maximum inner diameter of the cylinder part. Further, the minimum inner diameter of the cone part of the first tube part is preferably in the range of, for example, 5.0 mm to 10.0 mm. In the cone part, the shape of a cross section passing through its central axis is not necessarily a part of a perfect triangle. At least a part of the shape of the cross section may include a curve.

In the above spray chamber, the outer diameter of the cylinder part of the second tube part is smaller than the inner diameter of the cylinder part of the first tube part. Thus, the double tube part can be formed when the cylinder part of the first tube part and the cylinder part of the second tube part are at least partially overlapped with each other. The difference between the inner diameter of the cylinder part of the first tube part and the outer diameter of the cylinder part of the second tube part is preferably in the range of 1.0 mm to 6.0 mm. When the difference is in the range of 1.0 mm to 6.0 mm, space surrounded by the inside wall surface of the cylinder part of the first tube part and the outside wall surface of the cylinder part of the second tube part, that is, the width of space into which the additional gas is introduced can be in the range of 0.5 mm to 3.0 mm. The space having a width of equal to or more than 0.5 mm is preferable, from the viewpoint of facilitating the discharging of a waste liquid from the double tube part. Further, the space having a width of equal to or less than 3.0 mm is preferable, from the viewpoint of smoothly turning the gas flow of the additional gas introduced from the additional gas introduction tube part inside the double tube part. As an example, the inner diameter of the cylinder part of the second tube part is preferably in the range of, for example, 20.0 mm to 60.0 mm. For example, when the inner diameter of the cylinder part of the second tube part is equal to or more than 20 mm, it is possible to effectively prevent the collision between sample liquid droplets in a gas flow introduced from the sample introduction port part and reduce the loss of the liquid droplets due to the collision between the liquid droplets. Further, it is preferable that the inner diameter of the cylinder part of the second tube part is equal to or less than 60 mm, from the viewpoint of the miniaturization of the second tube part and the miniaturization of the spray chamber.

The second tube part has the cylinder part and the sample introduction port part, and is preferably composed of the cylinder part and the sample introduction port part. In an embodiment shown in FIG. 4C, an angle θ2 formed by the central axis direction (Z direction) of the sample introduction port part 121 and the central axis direction (Y direction) of the cylinder part of the first tube part is 30°. On the other hand, in an embodiment shown in FIG. 5B, the Z direction is the same direction as the Y direction (that is, the angle θ2 formed by the Z direction and the Y direction is 0°). The angle θ2 is defined in the range of 0° to 90°. If the angle θ2 is 0°, sample liquid droplets are not liable to collide with the wall surface of the cylinder part of the second tube part when a gas flow including the sample liquid droplets is introduced into the spray chamber from substantially the same direction as the central axis direction of the sample introduction port part. Thus, it seems that the wall surface attachment loss of liquid droplets in the spray chamber can be further effectively reduced. Accordingly, the Z direction is preferably the same direction as the Y direction, from the viewpoint of further improving the analytical sensitivity.

On the other hand, when a gas flow including sample liquid droplets is introduced into the spray chamber from substantially the same direction as the central axis direction of the sample introduction port part in a case in which the Z direction is inclined with respect to the Y direction, at least a part of the sample liquid droplets is liable to collide with the wall surface of the cylinder part of the second tube part. When colliding with the wall surface of the cylinder part of the second tube part, the liquid droplets can be crushed into finer liquid droplets. Therefore, it is likely that the liquid droplets discharged from the spray chamber are made finer. The sample liquid droplets that are made fine are preferable, from the viewpoint of stabilizing sensitivity in the analyzing unit of the analyzing device. Accordingly, when importance is placed on the stabilization of the sensitivity, the Z direction is preferably inclined with respect to the Y direction. For example, the angle θ2 is preferably in the range of 10° to 60°.

In the above spray chamber, the length of the cylinder part of the second tube part is preferably in the range of, for example, 10.0 mm to 70.0 mm. At least a part of the cylinder part constitutes the double tube part, and the above length includes the length of the part constituting the double tube part. The cylinder part of the second tube part is not a perfect cylinder shape as shown in, for example, an embodiment shown in FIGS. 3B and 4C, and its bottom surface part on the side of the sample introduction port part may be inclined with respect to the central axis direction of the cylinder part of the second tube part. In this case, the length of the cylinder part represents the shortest length (for example, a length I in FIG. 4C).

In the above spray chamber, the shape and the length of the discharging port part of the first tube part are not particularly limited so long as the discharging port part has an opening that serves as a discharging port. The shape of the tip of the discharging port part is only required to be determined according to the shape of the analyzing part since the tip generally serves as a part connected to the analyzing part in the analyzing device.

On the other hand, the shape and the length of the sample introduction port part of the second tube part are not particularly limited so long as the sample introduction port part has an opening to introduce a gas flow including sample liquid droplets from the nebulizer. The sample introduction port part generally serves as an insertion port part into which the tip of the nebulizer is inserted. The sample introduction port part can have, for example, a cylinder shape, but its shape is not particularly limited as described above.

As for the whole length of the above spray chamber, it is likely that the loss of liquid droplets in the spray chamber can be reduced as the whole length is shorter. On the other hand, it is likely that the particle size selection performance of the spray chamber is improved as the whole length is longer. In consideration of the above points, the whole length of the above spray chamber is preferably in the range of, for example, 80.0 mm to 200.0 mm. The whole length of the above spray chamber represents the shortest distance from one outermost end to the other outermost end of the spray chamber in a side view. For example, the whole length of the spray chamber corresponds to a length L in FIG. 4C or a length L in FIG. 5B.

The above spray chamber is capable of introducing the additional gas from the double tube part. Thus, it is possible to reduce the wall surface attachment loss of sample liquid droplets. However, due to the particle size selection of the sample liquid droplets on the basis of a gravity difference inside the spray chamber, a part of a sample liquid introduced as liquid droplets may remain inside the spray chamber without being discharged from the spray chamber. Further, a part of the sample liquid introduced as liquid droplets may remain inside the spray chamber due to the occurrence of wall surface attachment. The above spray chamber preferably has at least one waste liquid path to discharge the remaining sample liquid to the outside. For example, a waste liquid path to discharge the sample liquid remaining inside the first tube part can be provided at an arbitrary position of the first tube part. In an embodiment, the waste liquid path can be provided at a part constituting the double tube part. That is, the above spray chamber can have a waste liquid opening and a waste liquid tube part that serves as a waste liquid path to discharge a waste liquid to the outside from the inside of the double tube part via the waste liquid opening on the outside lateral surface of the double tube part (for example, the waste liquid tube part 113 in FIG. 3B). Further, on the outside lateral surface of the second tube part, the above spray chamber can have a waste liquid opening to discharge the sample liquid remaining inside the second tube part and a waste liquid tube part that serves as a waste liquid path to discharge a waste liquid from the inside of the second tube part to the outside (for example, the waste liquid tube part 122 in FIG. 3B).

In the present invention and the present specification, a "cylinder" described in relation to the cylinder part is not limited to one representing a perfect cylinder shape, and also includes an embodiment in which an end continuous with a cylinder shape part includes a part having a different inner diameter as described above. A "cone" described in relation to the cone part is not limited to one representing a perfect cone shape as described above. Further, "substantially the same" describing the positional relationship between two directions and "substantially the same" describing the sizes of two diameters include not only a perfect match but also a generally allowable error range. The error range represents, for example, a range of within 0.1° as for the positional relationship between two directions and represents, for example, a range of within 1% as for the sizes of two diameters.

The first tube part and the second tube part described above can be members made of arbitrary materials. As the materials, various glasses, quartz, a fluororesin, various resins classified into engineering plastics or super engineering plastics, or the like are preferable, from the viewpoint of chemical durability such as acid resistance and alkali resistance. Examples of the fluororesin can include various fluororesins such as polytetrafluoroethylene. Examples of the engineering plastics can include various engineering plastics such as polycarbonate (PC). Examples of the super engineering plastics can include various super engineering plastics such as polyetheretherketon (PEEK). From the above reason, the first tube part and the second tube part are preferably made of glass, quartz, or fluororesin. Further, the first tube part and the second tube part can be members having a single tube structure. The first tube part and the second tube part can be manufactured according to a known molding method.

The heating electromagnetic wave radiation unit described above performs the radiation of heating electromagnetic waves toward at least a part of the spray chamber other than a part into which the spray port part of the nebulizer is inserted. The heating electromagnetic wave radiation unit can radiate heating electromagnetic waves toward an arbitrary part of the spray chamber other than the part into which the spray port part of the nebulizer is inserted. In an embodiment, the heating electromagnetic wave radiation unit preferably at least performs the radiation of heating electromagnetic weaves toward a part of the spray chamber that is close to the end of the spray chamber to which at least a part of a gas flow introduced from the nebulizer is discharged. Assuming that the shortest distance from one outermost end to the other outermost end is L and the position of L/2 is a central part in a side view of the spray chamber, the part of the spray chamber that is close to the end represents at least a part of an area from the position of L/2 to the end to which at least a part of the gas flow is discharged. This part will also be called a "rear part" below. On the other hand, the part of the spray chamber that is close to the end into which the gas flow is introduced from the nebulizer represents at least a part of an area from the end to the position of L/2. This part will also be called a "front part" below. It seems that the radiation of heating electromagnetic waves toward the rear part is preferable from the viewpoint of preventing the occurrence of condensation inside the spray chamber due to a decrease in temperature after the liquid droplets of a sample liquid included in the gas flow is heated. The ability to prevent the condensation is preferable from the viewpoint of reducing a fluctuation in the signal intensity of a signal in the analyzing device. It is preferable to perform the radiation of heating electromagnetic waves toward only the rear part in one embodiment and preferable to perform the radiation of the heating electromagnetic waves toward the rear part and the front part in another embodiment.

The above sample introduction device can be suitably used to atomize a sample liquid and introduce the atomized sample liquid into various analyzing devices.

[Inductively Coupled Plasma Analyzing Device]

An aspect of the present invention relates to an inductively coupled plasma analyzing device (hereinafter also simply called an "analyzing device") including the above sample introduction device and the analyzing unit.

The details of the sample introduction device included in the above analyzing device are described above.

The above analyzing device is an inductively coupled plasma analyzing device and can include a plasma torch in at least the analyzing unit. For example, the inlet part 14 of the analyzing device shown in FIG. 2 is a part positioned closest to the sample introduction device in the analyzing unit and can serve as the inlet part of the plasma torch. The plasma torch is, for example, a part that performs ionization using plasma in an inductively coupled plasma-mass spectrometer (ICP-MS) or an inductively coupled plasma-atomic emission spectrometer (ICP-AES) that is an example of the inductively coupled plasma analyzing device.

As the installation angle of the above sample introduction device in the analyzing device, an angle θ3 formed by the horizontal direction (for example, an H direction in FIG. 2) of an installation surface on which the sample introduction device is installed and the central axis direction (for example, a Y direction in FIG. 2) of the spray chamber is preferably in the range of 0° to 90° (that is, from an angle parallel to the horizontal direction of the installation surface to an angle perpendicular to the horizontal direction of the installation surface). Thus, it is possible to improve particle size selection performance by which liquid droplets having a large particle size among sample liquid droplets introduced into the spray chamber from the nebulizer are dropped with gravity to select a particle size. The angle θ3 is defined in the range of 0° to ±90°. When the angle θ3 takes a negative value, the spray chamber is installed with its rear part positioned below its front part. When the angle θ3 takes a positive value, the spray chamber is installed with the front part positioned below the rear part. Further, one or more waste liquid openings for discharging a sample liquid remaining inside the discharging port part can be provided at arbitrary positions on the outside lateral surface of the discharging port part of the spray chamber. Particularly, when the angle θ3 takes a negative value, such waste liquid openings are preferably provided on the outside lateral surface of the discharging port part of the spray chamber.

In consideration of both viewpoints of the efficiency of introducing a sample into the analyzing unit and the particle size selection performance, the angle θ3 is more preferably in the range of 20° to 90°, still more preferably in the range of 20° to 70°, yet more preferably in the range of 20° to 50°, and even still more preferably in the range of 20° to 30°.

The inlet port of the plasma torch can include an injector. Sample liquid droplets introduced from the above sample introduction device are capable of being introduced into the plasma torch after passing through the injector. From the viewpoint of more stably introducing the sample liquid droplets into the central part of the plasma torch, the inner diameter of the injector is preferably equal to or less than 1.50 mm, more preferably equal to or less than 1.20 mm, still more preferably equal to or less than 1.00 mm, yet more preferably equal to or less than 0.90 mm, and even still more preferably equal to or less than 0.80 mm. From the viewpoint of the efficiency of introducing the sample liquid droplets, the inner diameter is preferably equal to or more than 0.50 mm.

A inductively coupled plasma analyzing device generally includes a gas supply source for supplying plasma generation gas to a plasma torch. As the plasma generation gas, argon gas is generally used. Accordingly, the above analyzing device can also include a gas supply source for supplying argon gas to the plasma torch. Further, in an embodiment, the above analyzing device can include, besides the gas supply source for supplying argon gas, gas supply sources for supplying one or more types of gas other than the argon gas to the plasma torch. The introduction of the other gas into the plasma torch is preferable from the viewpoint of increasing the density of electrons in plasma and accelerating ionization or improving signal intensity with the introduction of gas having different viscosity or specific heat. From the above viewpoints, the other gas is preferably supplied to the plasma torch by an amount smaller than that of the argon gas introduced as plasma generation gas per unit time. Further, in an embodiment, such gas can be introduced into the spray chamber. Examples of the gas can include one type or two or more types of gas selected from the group consisting of nitrogen gas, oxygen gas, and hydrogen gas. The amount of the argon gas supplied to the plasma torch per unit time as the plasma generation gas can be, for example, 16 L/min to 20 L/min. On the other hand, the amount of the other gas supplied to the plasma torch per unit time can be, for example, 1 mL/min to 30 mL/min. The argon gas for plasma generation and the other gas can be introduced into the plasma torch from the same gas flow path or different gas flow paths.

An analysis target sample included in sample liquid droplets introduced into the plasma torch is ionized by plasma generated at the tip of the plasma torch. Specific examples of the inductively coupled plasma analyzing device can include an ICP-MS and an ICP-AES. In the case of, for example, the ICP-MS, ion generated by the ionization is introduced into a mass spectrometer, subjected to mass selection by the mass spectrometer, and detected by an ion detector. Thus, it is possible to perform qualitative analysis on the basis of the mass of ion detected by the ion detector and perform quantitative analysis on the basis of the signal intensity of ion of each mass.

[Analyzing Method]

An aspect of the present invention relates to an analyzing method including performing the qualitative analysis, the quantitative analysis, or the qualitative analysis and the quantitative analysis of an analysis target sample with the above inductively coupled plasma analyzing device.

In the sample introduction device illustrated in FIG. 2 or the like, additional gas is introduced from the additional gas introduction part when a gas flow including sample liquid droplets flows through the flow path tube part. Thus, as described above, the introduced additional gas can turn inside the double tube part and generate a spiral gas flow (additional gas flow) toward the cone part of the first tube part. As the additional gas, the various gas illustrated as an example of carrier gas can be, for example, used. For example, the additional gas can be introduced from an additional gas supply source into the double tube part via the additional gas introduction tube part and the additional gas introduction opening after the gas supply source and the additional gas introduction tube part are connected to each other by a tube such as a resin tube. As the resin tube, a tube made of a fluororesin such as polyterafluoroethylene is suitable from the viewpoint of durability. The flow rate of the additional gas can be in the range of, for example, 0.3 L/min to 0.5 L/min but is only required to be appropriately set in consideration of the width of the space of the double tube part into which the additional gas is introduced, the size of the cone part, or the like. Therefore, the flow rate of the additional gas is not limited to the above range.

A gas flow including sample liquid droplets discharged from the spray chamber is introduced into the analyzing unit of the above analyzing device to perform qualitative analysis and/or quantitative analysis. The details of a specific example or the like of the analyzing unit are described above. Examples of an analysis target component can include various metal components, such as heavy metals and the like, and non-metal components.

In the analyzing method according to an aspect of the present invention described above, it is possible to perform, for example, the analysis of the metal components of silicon samples for various silicon samples such as various silicon wafers used as semiconductor substrates or the like and single crystal ingot for cutting out silicon wafers and the evaluation of the presence or absence and/or the degree of metal impurity contamination. Since the metal impurity contamination causes reason for failure in semiconductor devices, it is desirable to understand the presence or absence and/or the degree of the metal impurity contamination and eliminate a silicon wafer contaminated by metal impurities as a defective item or change manufacturing conditions or replace/correct a manufacturing device to reduce the metal impurity contamination. In recent years, semiconductor substrates have been requested to have higher quality with the high performance of devices or the like. In order to meet such a request, it is desirable to reduce the metal impurity contamination of silicon samples. The above analyzing method is suitable as, for example, a method for analyzing the metal components of various silicon samples. Using the above analyzing method, it is possible to perform, for example, the qualitative analysis and/or the quantitative analysis of a metal component as the evaluation of the metal impurity contamination of a silicon sample. When the evaluation of the metal impurity contamination of a silicon sample is performed, a sample liquid obtained by dissolving a part or the whole of the silicon sample that is an evaluation target or a sample liquid obtained by causing a collection liquid such as an acid solution to scan the surface of the silicon sample and causing the collection liquid to take in a metal component attached to the surface can be introduced into a nebulizer after undergoing pretreatment such as dilution with an acid solution or the like where necessary to be subjected to metal component analysis. According to an analysis result thus obtained, it is possible to evaluate the presence or absence or the degree of various metal impurity contamination such as the surface layer part metal impurity contamination, the bulk metal impurity contamination, and the surface metal impurity contamination of a silicon sample.

However, the present invention is not limited to the evaluation of the metal impurity contamination of a silicon sample, and is applicable to the analysis of components in various fields.

EXAMPLES

Hereinafter, the present invention will be further described on the basis of Examples. However, the present invention is not limited to embodiments shown in the Examples.

In the following Examples, a tube made of polytetrafluoroethylene was connected to the additional gas introduction tube part of a spray chamber to introduce gas, and a tube made of polyvinyl chloride was connected to a waste liquid tube part to discharge a waste liquid. Further, the first tube part and the second tube part of the spray chamber in the following Examples were made of glass.

Example 1

The spray chamber of a commercially-available double-focusing ICP-MS was replaced with a spray chamber having the configuration shown in FIGS. 5A and 5B except that an angle $\theta 1$ was 90° to prepare the ICP-MS of Example 1. In the ICP-MS of Example 1, the angle $\theta 1$ was 90°, an angle $\theta 2$ was 0°, an angle $\theta 3$ was 30°, the maximum inner diameter of the cone part of the first tube part was 45.0 mm, the ratio of the length of the cone part to the maximum inner diameter of the cone part (the length/the maximum inner diameter) was 0.5, the length of a double tube part was 20.0 mm, the diameters of an additional gas introduction opening as well as the waste liquid openings of the double tube part and the second tube part were 3.0 mm, the inner diameter (maximum inner diameter) of the cylinder part of the first tube part was 45.0 mm, the outer diameter of the cylinder part of the second tube part was 42.0 mm, and the whole length of the spray chamber was 130.0 mm.

At a rear part on the outside of the spray chamber, a heating electromagnetic wave radiation unit having a ring shape was installed as shown in FIG. 1. In the heating electromagnetic wave radiation unit, a plurality of near-infrared lamps were arranged in a circumferential direction inside a ring-shaped cover part.

As a sample liquid, hydrofluoric acid (HF solution) including 1 ppb (volume basis) of In and 2000 ppm (volume basis) of Si as well as having a HF concentration of 1 mass % was prepared.

In the above ICP-MS, the sample liquid was introduced into a nebulizer at an introduction amount of 100 µL/min. Then, the sample liquid was atomized by the nebulizer using carrier gas (argon gas having a flow rate of 0.75 L/min) to generate a gas flow including sample liquid droplets. The gas flow including the sample liquid droplets was introduced into the flow path tube part of the spray chamber from the sample introduction tube part of the spray chamber. Near-infrared rays were continuously radiated from the heating electromagnetic wave radiation unit, while the gas flowed through the flow path tube part. In addition, argon gas was continuously introduced into the double tube part via the additional gas introduction opening from the additional gas introduction tube part at a flow rate of about 0.4 L/min. In this manner, the signal intensity of In output from the ICP-MS was monitored. From monitoring results thus obtained, the relative intensity ratio of the intensity of the In was plotted relative to near-infrared ray radiation time as a relative intensity ratio to generate a graph assuming that signal intensity at the radiation start (0 min.) of the near-infrared rays is 1.0.

Comparative Example 1

Except that the installation position of the heating electromagnetic wave radiation unit was moved to a position at which an area on the side of the sample introduction port part of the cylinder part of the second tube part of the spray chamber and the sample introduction port part were covered and that the radiation of infrared rays was performed toward a part into which the spray port part of the nebulizer was inserted, the signal intensity of In was monitored as is the case with Example 1. From obtained monitoring results, a graph was generated like Example 1.

Figure 6:
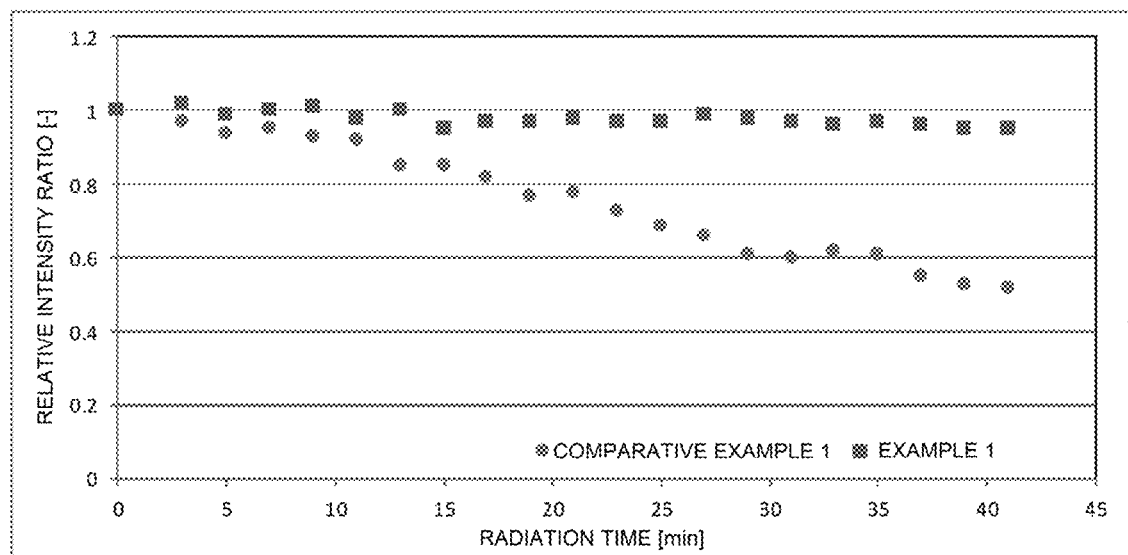
FIG. 6 shows the monitoring results of the signal intensity of In obtained in Example 1 and Comparative Example 1.

The graphs generated for Example 1 and Comparative Example 1 are shown in FIG. 6.

It is confirmable from the results shown in FIG. 6 that the relative intensity ratio, that is, the analytical sensitivity of Comparative Example 1 was reduced in proportion to the near-infrared ray radiation time in comparison with Example 1. This is because the radiation of the near-infrared rays was performed toward the part into which the spray port part of the nebulizer was inserted and thus Si included in the sample liquid was dried at the tip of the spray port part of the nebulizer to cause clogging in Comparative Example 1. On the other hand, the radiation of the near-infrared rays was performed toward a part other than the part into which the spray port part of the nebulizer was inserted in Example 1. For this reason, it was possible to prevent a reduction in analytical sensitivity due to the radiation of the near-infrared rays.

Example 2

Except that hydrofluoric acid (HF solution) including 1 ppb (volume basis) of In and having a HF concentration of 1 mass % was used as a sample liquid, the signal intensity of the In was monitored as is the case with Example 1. 20 measurement results (the signal intensity of the In) were extracted from obtained monitoring results, and their relative standard deviation (RSD) was calculated.

Example 3

Except that the installation position of the heating electromagnetic wave radiation unit was moved to a position at which the cylinder part of the second tube part of the spray chamber was covered (however, the part, into which the spray port part of the nebulizer was inserted, was not covered) and that the radiation of near-infrared rays was performed toward the front part of the spray chamber, the signal intensity of In was monitored as is the case with Example 2. 20 measurement results (the signal intensity of the In) were extracted from obtained monitoring results, and their relative standard deviation (RSD) was calculated.

Figure 7:
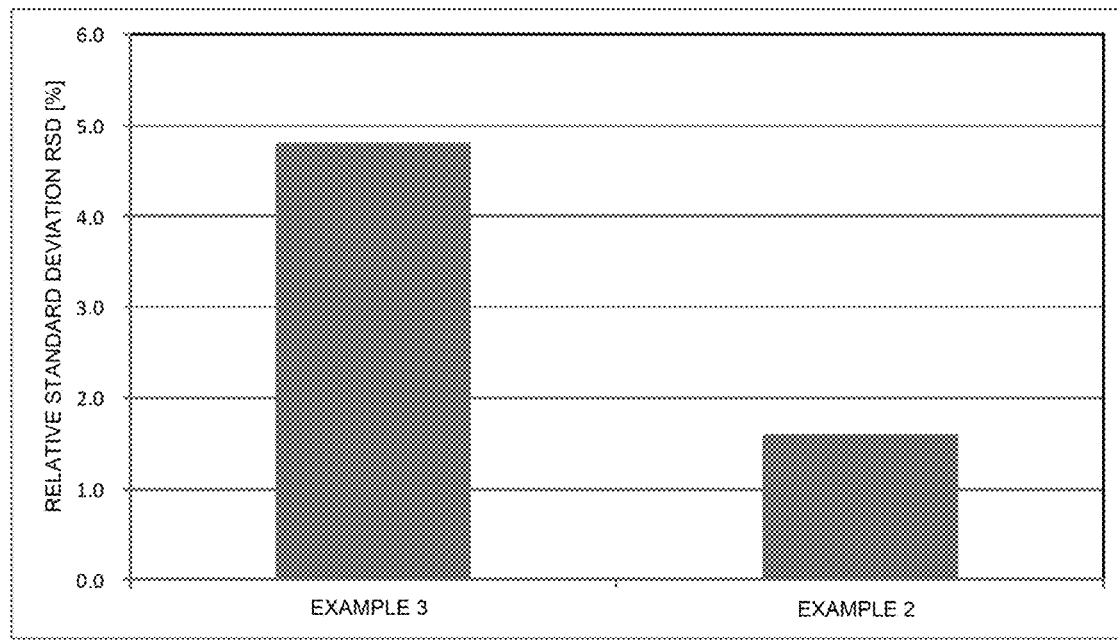
FIG. 7 shows the relative standard deviations (RSDs) of the signal intensity of In calculated in Examples 2 and 3.

The relative standard deviations (RSDs) calculated for Examples 2 and 3 are shown in FIG. 7.

It is confirmable from results shown in FIG. 7 that a fluctuation in the signal intensity of Example 2, in which the radiation of heating electromagnetic waves was performed toward the rear part of the spray chamber, was more reduced (that is, a signal was obtained with more stable intensity) in comparison with Example 3.

Example 4

Except that three types of injectors having different inner diameters (0.75 mm, 1.00 mm, and 1.50 mm) were used as injectors for a plasma torch and that hydrofluoric acid (HF solution) including 1 ppb (volume basis) of each of analytes Co, Y, Ce, and TI as well as having a HF concentration of 1 mass % was used as a sample liquid in an ICP-MS having the same configuration as that of Example 1, the signal intensity of the analytes was monitored as is the case with Example 1. For comparison, the sample liquid was analyzed similarly without performing the radiation of electromagnetic waves by the heating electromagnetic wave radiation unit to measure the signal intensity of the analytes. The signal intensity of each of the analytes is shown in FIG. 8 as a relative intensity ratio relative to signal intensity without the radiation of heating electromagnetic waves (the signal intensity with the radiation of the heating electromagnetic waves/the signal intensity without the radiation of the heating electromagnetic waves).

Figure 9:
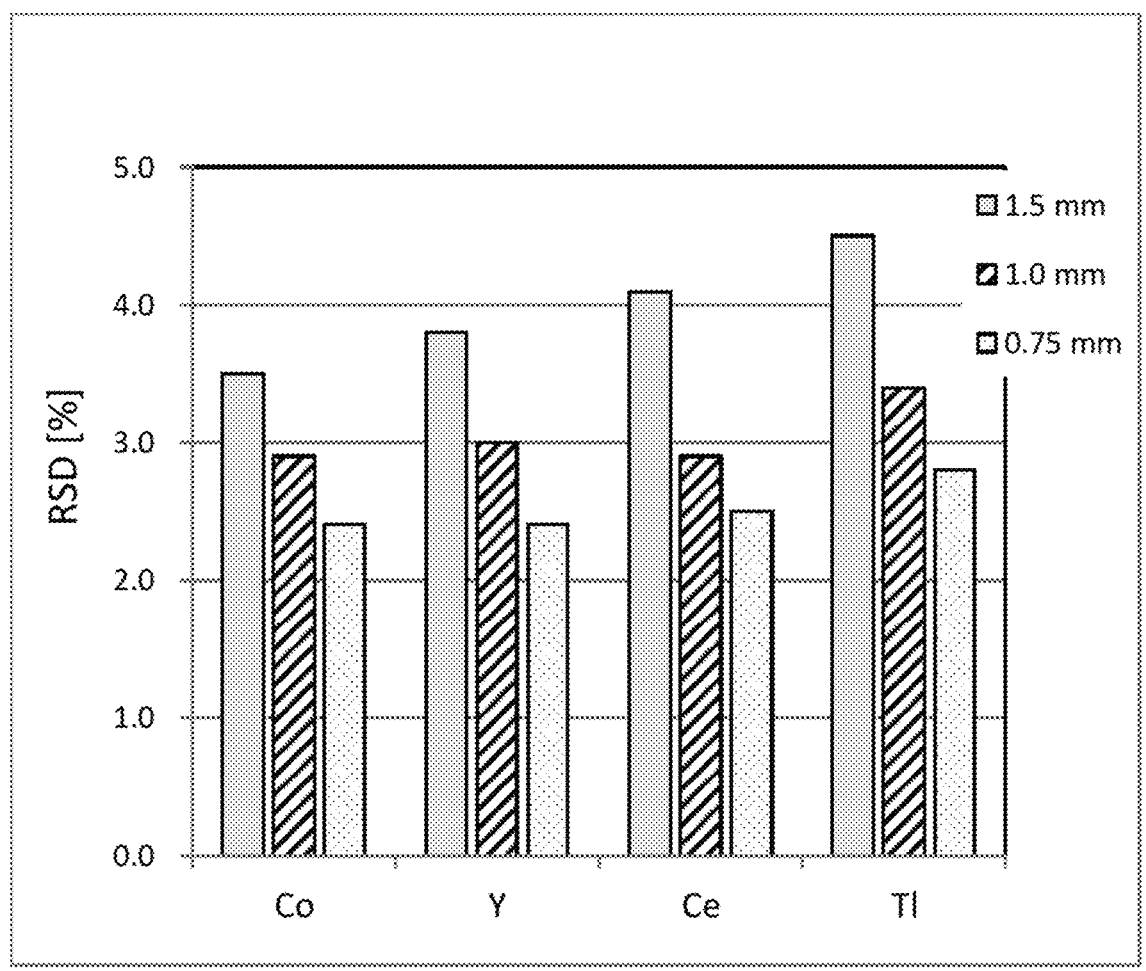
FIG. 9 shows the relative standard deviations (RSDs) of the signal intensity of the various analytes obtained in Example 4.

Moreover, 20 signal intensity of the analytes obtained by the respective injectors were extracted, and their relative standard deviations (RSDs) were calculated. Calculated results are shown in FIG. 9.

Figure 8:
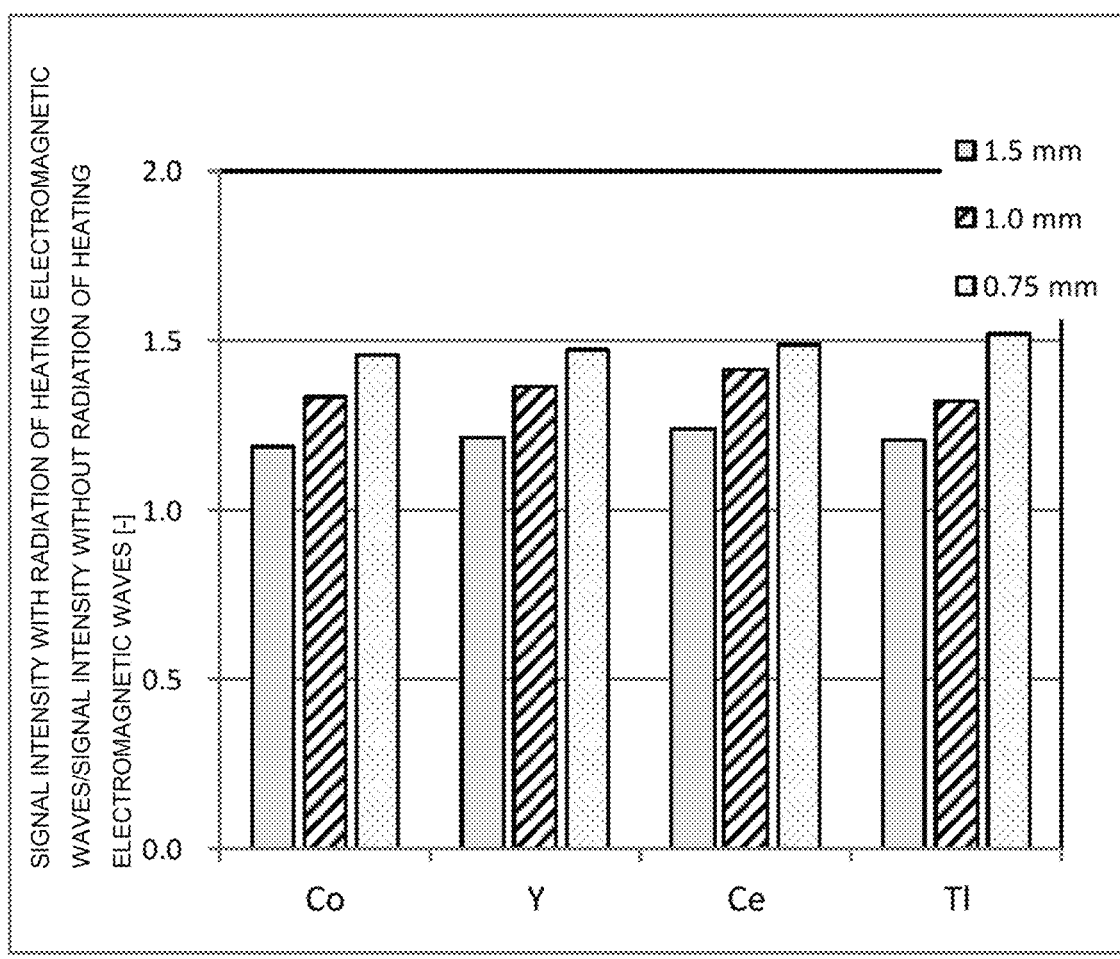
FIG. 8 shows the relative intensity ratios of the signal intensity of various analytes (signal intensity with the radiation of heating electromagnetic waves/signal intensity without the radiation of the heating electromagnetic waves) obtained in Example 4.

It is confirmable from the results shown in FIG. 8 that the signal intensity was more increased, that is, analytical sensitivity was more improved by the radiation of the heating electromagnetic waves in all cases in which the three types of injectors were used in comparison with a case without the radiation of the heating electromagnetic waves. Moreover, it is confirmable from the results shown in FIG. 8 that the analytical sensitivity was more improved when the injectors having smaller inner diameters were used. Moreover, it is confirmable from the results shown in FIG. 9 that a fluctuation in the signal intensity was more prevented when the injectors having smaller inner diameters were used.

Example 5

Except that $N_2$ (having a flow rate of 30 mL/min) was introduced from a flow path different from a flow path for plasma generation argon gas (having a flow rate of 18 L/min) into a plasma torch and that hydrofluoric acid (HF solution) including 1 ppb (volume basis) of each of analytes Co, Y, Ce, and TI as well as having a HF concentration of 1 mass % was used in an ICP-MS having the same configuration as that of Example 1, the signal intensity of the analytes was measured as is the case with Example 4 (in which an injector having an inner diameter of 1.50 mm was used). Aside from the measurement, measurement in which points other than the point that $N_2$ was not introduced were the same was carried out. The signal intensity of each of the analytes is shown in FIG. 10 as a relative intensity ratio relative to signal intensity without the introduction of the $N_2$ (the signal intensity with the introduction of the $N_2$/the signal intensity without the introduction of the $N_2$).

Moreover, 20 measurement results (the signal intensity of each of the analytes) were extracted from the measurement results with the introduction of the $N_2$, and their relative standard deviations (RSDs) were calculated. Calculated results are shown in FIG. 11.

Figure 10:
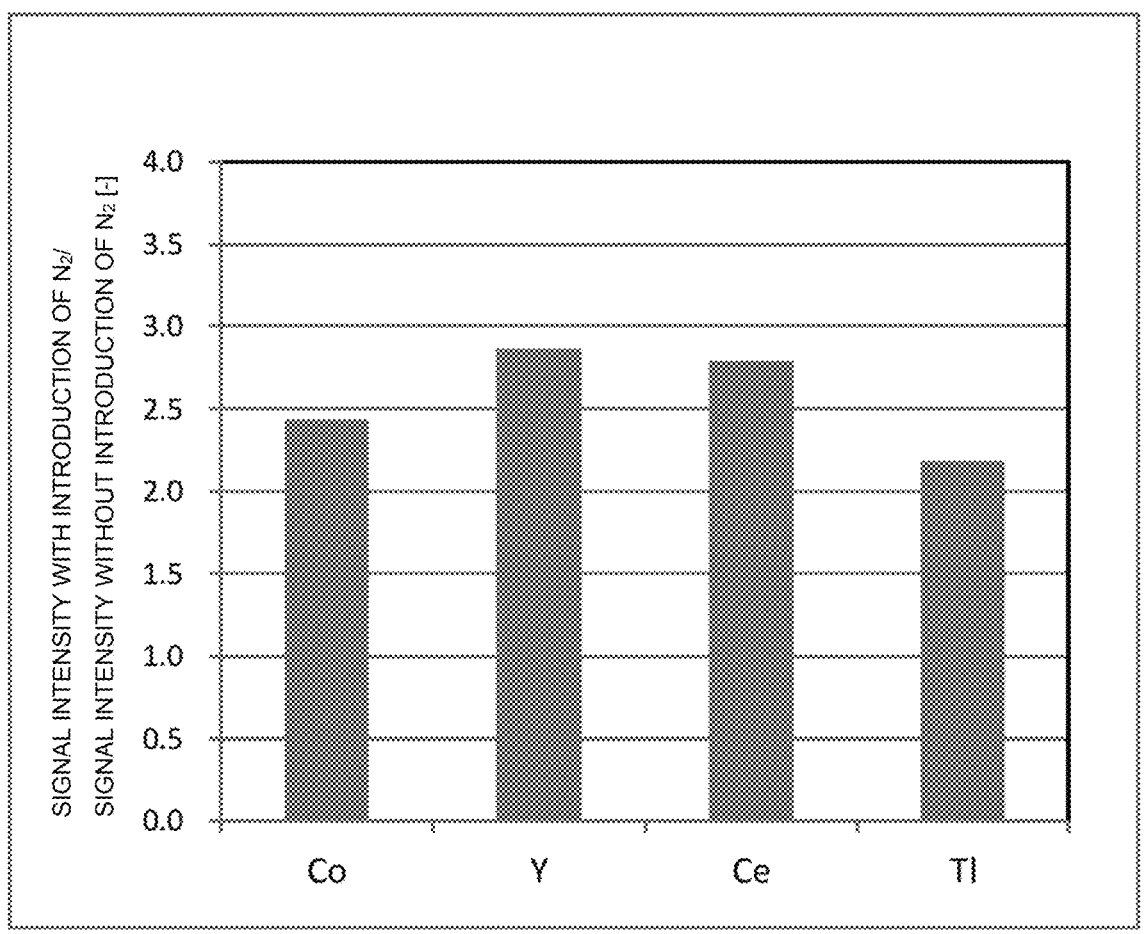
FIG. 10 shows the relative intensity ratios of the signal intensity of the various analytes (signal intensity with the introduction of $N_2$/signal intensity without the introduction of the $N_2$) obtained in Example 5.

It is confirmable from the results shown in FIG. 10 that the signal intensity was more increased, that is, analytical sensitivity was more improved by the introduction of the $N_2$ in comparison with a case without the introduction of the $N_2$ into the plasma torch.

Figure 11:
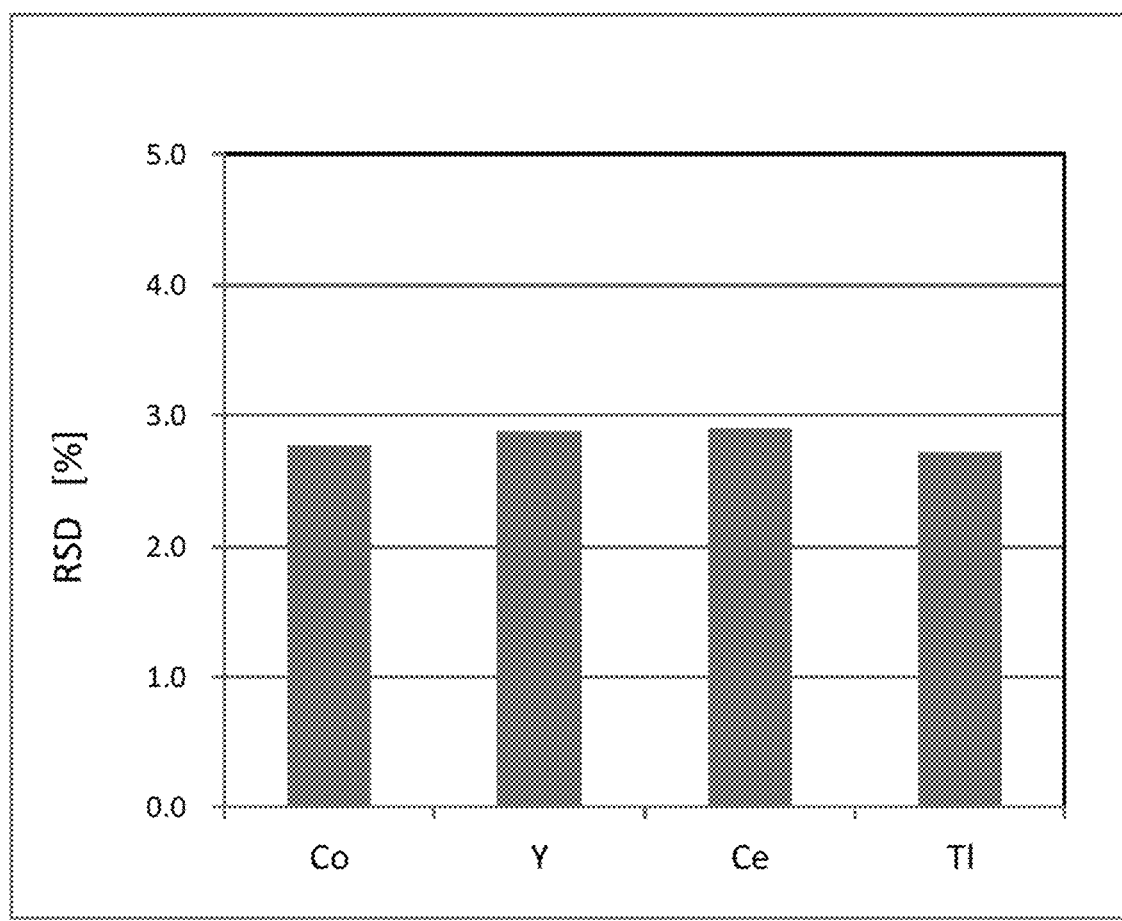
FIG. 11 shows the relative standard deviations (RSDs) of the signal intensity of various analytes obtained in Example 5.

Moreover, by comparing the result shown in FIG. 11 with a case (without the introduction of the $N_2$) in which the injector having an inner diameter of 1.50 mm in FIG. 9 was used, it is confirmable that a fluctuation in the signal intensity is more prevented by the introduction of the $N_2$ into the plasma torch.

It is confirmable from the above results that it is possible to obtain a reliable analysis result in an inductively coupled plasma analyzing device according to an aspect of the present invention.

What is claimed is:
1. A sample introduction device, comprising:
   a nebulizer that atomizes a sample liquid;
   a spray chamber that has one end into which a tip of the nebulizer is inserted and the other end from which at least a part of liquid droplets of the sample liquid sprayed from the tip is discharged to an outside; and
   a heating electromagnetic wave radiation unit that is arranged outside the spray chamber, wherein
   the heating electromagnetic wave radiation unit performs radiation of heating electromagnetic waves from the outside of the spray chamber toward at least a part of the spray chamber other than a part into which the tip of the nebulizer is inserted, and the heating electromagnetic wave radiation unit has a ring shape, and the spray chamber is inserted into a hollow part of the ring shape.

2. The sample introduction device according to claim 1, wherein the heating electromagnetic waves include near-infrared rays.

3. The sample introduction device according to claim 1, wherein the spray chamber is made of glass, quartz, or a fluororesin.

4. The sample introduction device according to claim 1, wherein the heating electromagnetic wave radiation unit performs the radiation of the heating electromagnetic waves toward at least a part of the spray chamber that is close to the end of the spray chamber to which at least a part of the liquid droplets is discharged.

5. The sample introduction device according to claim 1, wherein an amount of introduction of the sample liquid into the nebulizer is equal to or more than 1 µL/min and equal to or less than 500 µL/min.

6. An inductively coupled plasma analyzing device, comprising the sample introduction device according to claim 1.

7. The inductively coupled plasma analyzing device according to claim 6,
wherein the device comprises a plasma torch and an injector that introduces an analysis target sample into the plasma torch, and
an inner diameter of the injector is equal to or more than 0.50 mm and equal to or less than 1.50 mm.

8. The inductively coupled plasma analyzing device according to claim 7,
which further comprises a gas supply source that supplies argon gas to the plasma torch and one or more gas supply sources that supply one or more types of gas other than the argon gas.

9. The inductively coupled plasma analyzing device according to claim 8,
wherein the one or more types of gas are selected from the group consisting of nitrogen gas, oxygen gas, and hydrogen gas, and the gas is supplied to the plasma torch by an amount smaller than an amount of the argon gas per unit time.

10. The inductively coupled plasma analyzing device according to claim 6,
which is an inductively coupled plasma-mass spectrometer or an inductively coupled plasma-atomic emission spectrometer.

11. An analyzing method, comprising performing qualitative analysis, quantitative analysis, or the qualitative analysis and the quantitative analysis of an analysis target sample with the inductively coupled plasma analyzing device according to claim 6.

12. The analyzing method according to claim 11,
which performs qualitative analysis, quantitative analysis, or quantitative analysis and quantitative analysis of a metal component in an analysis target sample.

* * * * *